United States Patent
Coureau et al.

(10) Patent No.: US 9,448,736 B2
(45) Date of Patent: Sep. 20, 2016

(54) ELECTRONIC STORAGE MODULE, METHOD FOR ASSIGNING CONTACTS OF AN ELECTRONIC STORAGE MODULE, METHOD FOR IMPLEMENTING AN ASSIGNMENT

(75) Inventors: Laurent Coureau, Morangis (FR); Aude Pichelin, Issy les Moulineaux (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/232,528

(22) PCT Filed: Jul. 9, 2012

(86) PCT No.: PCT/FR2012/051621
§ 371 (c)(1),
(2), (4) Date: Jan. 13, 2014

(87) PCT Pub. No.: WO2013/007942
PCT Pub. Date: Jan. 17, 2013

(65) Prior Publication Data
US 2014/0149613 A1    May 29, 2014

(30) Foreign Application Priority Data
Jul. 12, 2011    (FR) ...................... 11 56335

(51) Int. Cl.
*G06F 3/00*    (2006.01)
*G06F 3/06*    (2006.01)
(Continued)

(52) U.S. Cl.
CPC ............ *G06F 3/0632* (2013.01); *G06F 3/061* (2013.01); *G06F 3/0671* (2013.01); *G06K 19/07733* (2013.01); *G06K 19/07* (2013.01)

(58) Field of Classification Search
CPC ..................................................... G06K 19/07
See application file for complete search history.

(56) References Cited

U.S. PATENT DOCUMENTS 6,439,464 B1 *  8/2002  Fruhauf et al. ............... 235/492
RE40,378 E       6/2008  Sarat
(Continued)

FOREIGN PATENT DOCUMENTS

| EP | 1484708 A2 | 12/2004 |
| WO | 9949415 A2 | 9/1999 |
| WO | 0231761 A1 | 4/2002 |

OTHER PUBLICATIONS

International Search Report and Written Opinion dated Oct. 19, 2012 for corresponding International Application No. PCT/FR2012/051621, filed Jul. 9, 2012.

(Continued)

*Primary Examiner* — Zachary K Huson
(74) *Attorney, Agent, or Firm* — David D. Brush; Westman Champlin & Koehler, P.A.

(57) ABSTRACT

Provided are an electronic storage module, a method for assigning contacts of an electronic storage module and a method for implementing an assignment. Exemplary modules include chip cards such as SIM cards (Subscriber Identification Modules), in particular but not limited to cards that use six contacts. The electronic storage module has a plurality of contacts, including at least one reset contact and at least one first set of contacts forming a first communication interface between the electronic storage module and an electronic device including the electronic storage module. The set of contacts constitutes at least one second communication interface. The reset contact makes it possible to indicate which one of the first or second communication interfaces the first set of contacts uses at a given time.

12 Claims, 3 Drawing Sheets

(51) Int. Cl.
*G06K 19/077* (2006.01)
*G06K 19/07* (2006.01)

(56) References Cited

U.S. PATENT DOCUMENTS

2008/0245878 A1* 10/2008 Shiota ............... G06K 19/07
                                                               235/492
2010/0108772 A1    5/2010  Hartel

OTHER PUBLICATIONS

International Preliminary Report on Patentability and English translation of Written Opinion for corresponding International Application No. PCT/FR2012/051621, filed Jul. 9, 2012.

French Search Report and Written Opinion dated Feb. 28, 2012 for corresponding French Application No. FR 1156335, filed Jul. 12, 2011.

* cited by examiner

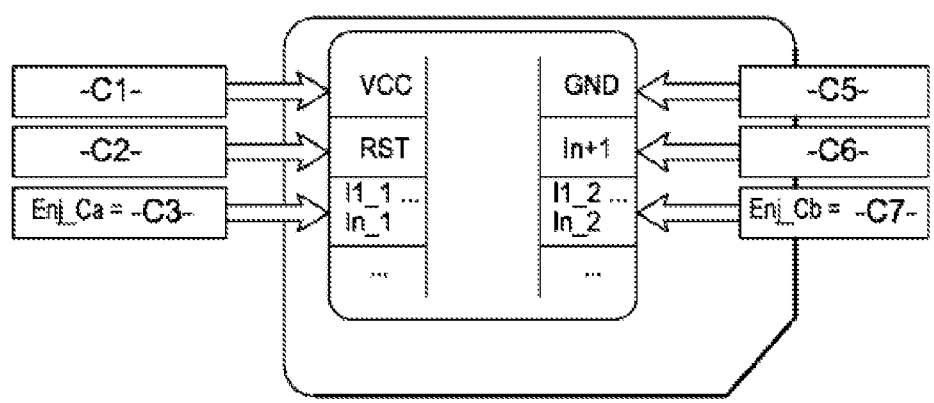
Fig. 3
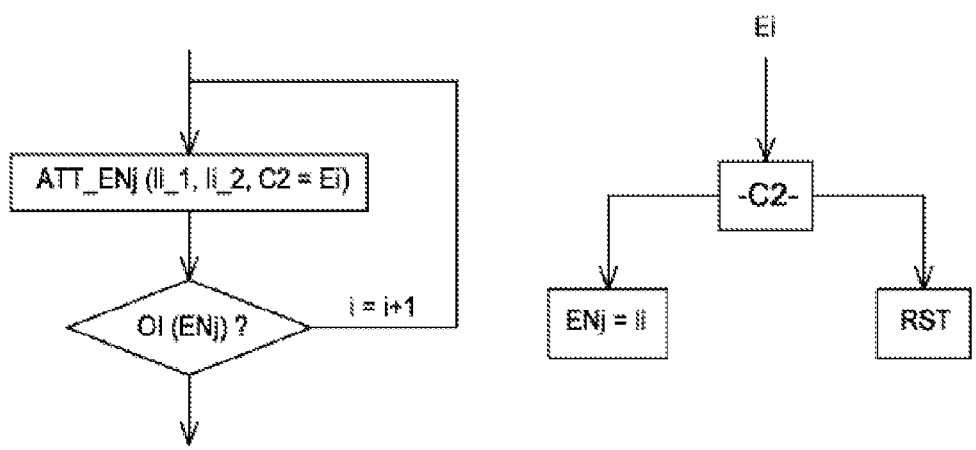
Fig. 4          Fig. 5

ELECTRONIC STORAGE MODULE, METHOD FOR ASSIGNING CONTACTS OF AN ELECTRONIC STORAGE MODULE, METHOD FOR IMPLEMENTING AN ASSIGNMENT

CROSS-REFERENCE TO RELATED APPLICATIONS

This Application is a Section 371 National Stage Application of International Application No. PCT/FR2012/051621, filed Jul. 9, 2012, which is incorporated by reference in its entirety and published as WO 2013/007942 on Jan. 17, 2013, not in English.

FIELD OF THE DISCLOSURE

The invention concerns an electronic storage module and a method for assigning the contacts of an electronic storage module. In particular, the invention concerns chip cards such as the UICC (Universal Integrated Circuit Card) card, a chip card commonly used for accessing mobile networks, notably allowing a SIM (for Subscriber Identity Module) or USIM (Universal Subscriber Identity Module) application to be contained and executed in order to authenticate the subscriber on 2G/GSM or 3G/UMTS networks. The invention applies notably but not only to cards implementing 6 contacts.

BACKGROUND OF THE DISCLOSURE

This chip card has eight contacts, as defined by the ETSI standard, allowing an electronic device to interact with the data stored in the electronic chip.
Among the eight contacts defined by the ETSI standard:
a first contact is assigned to a supply of power for the electronic chip,
a second contact, separate from the first contact, is assigned to a ground,
a third contact, separate from the first and second contacts, is assigned to reinitialization of the electronic chip,
two contacts (fourth and fifth contacts, separate from the first, second and third contacts) are assigned to a communication interface according to the ISO standard,
two contacts (sixth and seventh contacts, separate from the first, second, third, fourth and fifth contacts) can be assigned to a communication interface according to the USB standard, and
an eighth contact, separate from the first, second, third, fourth, fifth, sixth and seventh contacts, can be assigned to a communication interface according to the SWP standard.

Today, the production of electronic chips having only six contacts is envisaged. On such six-contact chips, the ETSI standard can today assign just a single communication interface requiring two contacts, no more than three communication interfaces requiring a single contact or two communication interfaces, one of which requires two contacts and the other a single contact. Therefore, the ETSI standard does not allow the two ISO and USB communication interfaces to be assigned on an electronic chip with six contacts.

The document US RE40,378 proposes another assignment of the USB communication interface by starting from an 8-contact electronic chip implementing just a single communication interface according to the ISO standard and by assigning:
one of the two contacts of the communication interface from the ISO standard to a communication interface according to the USB standard as well,
and one of the free contacts to the communication interface according to the USB standard, this free contact furthermore allowing indication, as a function of its state, of whether the electronic chip implements the ISO communication interface or the USB communication interface.

Thus, according to the teaching of the document US RE40,378 an eight-contact electronic chip to which the two ISO and USB communication interfaces are assigned has 6 assigned contacts and two free contacts for other assignments.

Therefore, an electronic chip with six contacts according to the assignment of the contacts by the teaching of the document US RE40,378 could have the two ISO and USB communication interfaces but would not allow the assignment of a third interface, notably the interface according to the SWP standard.

SUMMARY

An object of the invention is an electronic storage module having a plurality of contacts, including at least one reinitialization contact, and at least one first set of contacts constituting a first communication interface between the electronic storage module and an electronic device having said electronic storage module, characterized in that said set of contacts constitutes at least one second communication interface, the reinitialization contact allowing indication of which of the first and second communication interfaces said first set of contacts implements at a given instant.

Thus, an electronic storage module having a number of predetermined contacts allows a larger number of communication interfaces to be proposed. Alternatively, the invention allows an electronic storage module having a smaller number of contacts with the same communication interfaces to be proposed.

Advantageously, said reinitialization contact triggers reinitialization of the content of the electronic storage module upon a change of state of said reinitialization contact.

Advantageously, said reinitialization contact triggers the implementation of a communication interface predetermined by said first set of contacts as a function of the state of said reinitialization contact. Thus, the electronic storage module uses one contact less for implementing the same number of communication interfaces.

Advantageously, said electronic storage module has at least one second set of contacts constituting a third communication interface. Thus, the electronic storage module frees a contact for implementing an additional communication interface.

Advantageously, said electronic storage module has six contacts, including:
said first set of contacts—having two contacts—constituting a first communication interface according to the ISO standard and a second communication interface according to the USB standard,
said reinitialization contact indicating:
in a first state that said first set of contacts implements the first communication interface according to the ISO standard, in a second state that said first set of contacts implements the second communication interface according to the USB standard, upon a change between the first and second states, a reset to the default state of the electronic storage module (reinitialization function).

Advantageously, one of said six contacts constitutes a third communication interface according to the SWP standard.

Another object of the invention is a method for assigning contacts of an electronic storage module having a plurality of contacts, including at least one reinitialization contact, and at least one first set of contacts, characterized in that said assignment method involves the assignment to said set of contacts of at least one first communication interface and a second communication interface between the electronic storage module and an electronic device as a function of a state of said reinitialization contact.

Advantageously, according to one implementation of the invention, the various steps of the method according to the invention are implemented by a piece of software or computer program, this software comprising software instructions intended to be executed by a data processor of a device for assigning a function to a contact of an electronic storage module and being designed to control the execution of the various steps of this method.

The invention is therefore also aimed at a program comprising program code instructions for the execution of the steps of the assignment method as claimed in the preceding claim when said program is executed by a processor.

An object of the invention is also a method for implementing assignment of the contacts of an electronic storage module having a plurality of contacts, including at least one reinitialization contact, and at least one first set of contacts, characterized in that said assignment implementation method involves the implementation, as a function of the current state of said reinitialization contact, by said set of contacts of a communication interface among at least one first communication interface and a second communication interface between the electronic storage module and an electronic device that are assigned to said first set of contacts.

Advantageously, according to one implementation of the invention, the various steps of the method according to the invention are implemented by a piece of software or computer program, this software comprising software instructions intended to be executed by a data processor of a device that is part of the electronic storage module and being designed to control the execution of the various steps of this method.

The invention is therefore also aimed at a program comprising program code instructions for the execution of the steps of the assignment implementation method as claimed in the preceding claim when said program is executed by a processor These programs can use any programming language and may be in the form of source code, object code or intermediate code between source code and object code, such as in a partially compiled form or in any other desirable form.

An object of the invention is furthermore an electronic device having means for connecting at least one electronic storage module, the connection means having a plurality of connectors allowing each to connect a contact of an electronic storage module, including at least one reinitialization connector, and at least one first set of connectors constituting a first communication interface between the electronic storage module and the electronic device, characterized in that said set of connectors constitutes at least one second communication interface between the electronic storage module and the electronic device, the reinitialization connector allowing indication of which of the first and second communication interfaces said first set of contacts implements at a given instant.

BRIEF DESCRIPTION OF THE DRAWINGS

The features and advantages of the invention will emerge more clearly upon reading the description, given by way of example, and the figures that relate thereto, in which:

FIG. 3 shows an electronic storage module according to the invention with at least six contacts to which at least three communication interfaces are assigned, FIG. 4 shows an assignment method according to the invention, and FIG. 5 shows a method for implementing assignment according to the invention.

DETAILED DESCRIPTION OF ILLUSTRATIVE EMBODIMENTS

Electronic storage module is understood to mean any type of storage device having a defined number of means for interchange with at least one electronic device, each interchange means being assigned to at least one predefined function when it is manufactured or when it is reprogrammed. In particular, an electronic storage module is an electronic chip such as the electronic chip of the UICC card.

Contacts of an electronic storage module are understood to mean all interchange means of said electronic storage module for interchange with at least one electronic device. In particular, the elements of said electronic storage module allow setup of physical contact with an electronic device in order to allow the transmission of a signal by said contacts between said electronic storage module and said electronic device, said signal notably being a supply of power for the electronic storage module or transporting at least one useful data item.

Electronic device is understood to mean any electronic device that may have, at least at discrete points, an electronic storage module and that may implement said electronic storage module at the time of the implementation of at least one method of processing by said electronic device. Notably, the electronic device is a mobile telephone, a payment terminal, a computer, etc., particularly at the time of a method of communication and/or of local processing.

Figure 1A:
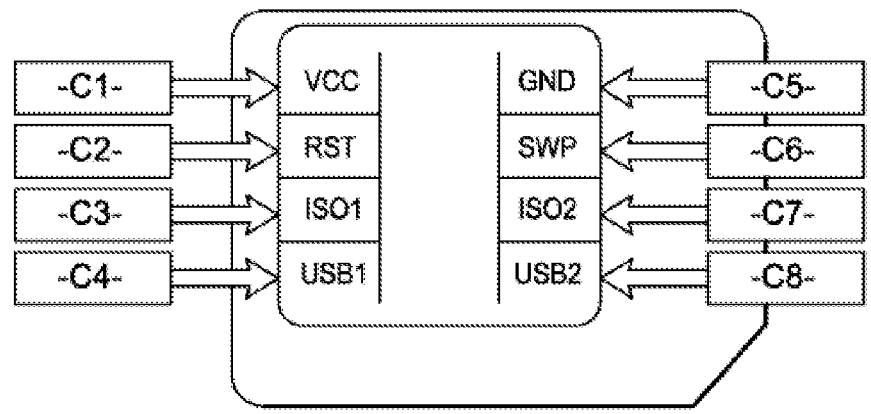
FIGS. 1a and 1b show an electronic storage module according to the prior art, both according to the current ETSI standard and according to the document US RE40,378.

FIG. 1 a illustrates an electronic storage module with eight contacts according to the current ETSI standard.

The eight contacts of the storage module are defined vis-à-vis an electronic device, notably the mobile terminal, as follows: the contact C1 allows the mobile terminal (not shown) to supply a voltage Vcc to (power) the electronic storage module: said voltage may currently be 1.8 volts, 3 volts or 5 volts. The contact C2 allows reinitialization (reset) RST of the electronic storage module. The contact C5 allows provision of the ground GND for the supply of power by the mobile terminal. The contacts C3 and C7 constitute a first, ISO communication interface: the contact C3 providing the clock ISO1 of the ISO communication interface and the contact C3 allowing the inputs/outputs—I/O—of data ISO2 according to the ISO standard between the electronic storage module and the mobile terminal. The contacts C4 and C8 constitute a second, USB (Universal Serial Bus) communication interface: the contacts C4 and C8, which are also called D+ and D−, respectively, allowing the transmission of the data between the electronic storage module and the mobile terminal on a differential pair (USB1, USB2). The contact C6 constitutes a third, SWP (Single Wire Protocol) communication interface: this is a communication interface that is used for contactless protocols.

Figure 1B:
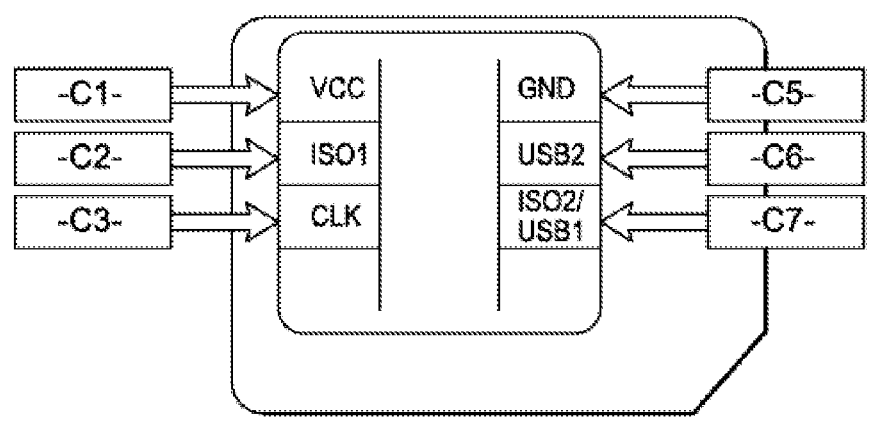

FIG. 1b illustrates an electronic storage module according to the document US RE40,378.

The eight contacts of the storage module are defined vis-à-vis an electronic device, notably the mobile terminal, as follows: the contact C1 allows the mobile terminal (not illustrated) to supply (power) Vcc the electronic storage module: this may currently be 1.8 volts, 3 volts or 5 volts. The contact C2 allows reinitialization (reset—RST) of the electronic storage module. The contact C5 allows provision of the ground (GND) for the supply of power by the mobile terminal. The contacts C3 and C7 constitute a first, ISO communication interface: the contact C3 providing the clock ISO1 of the ISO communication interface and the contact C3 allowing the inputs/outputs—I/O—of data ISO2 according to the ISO standard between the electronic storage module and the mobile terminal. The contacts C6 and C7 constitute a second, USB (Universal Serial Bus) communication interface: the contacts C6 and C7 allow the transmission of the data between the electronic storage module and the mobile terminal on a differential pair (USB1, USB2). Furthermore, the contact C6 allows indication of which of the first and second communication interfaces, ISO or USB, respectively, is implemented by the contact C7.

Figure 2A:
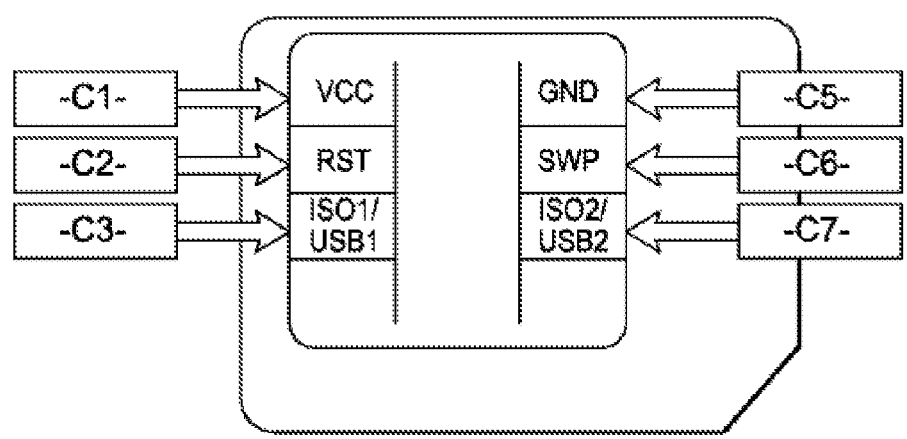
FIGS. 2a and 2b show an electronic storage module according to the invention, both with eight and six contacts, to which contacts three communication interfaces according to the ISO, USB and SWP standards are assigned.

FIG. 2a illustrates an electronic storage module with eight contacts according to the invention, to which contacts three communication interfaces according to the ISO, USB and SWP standards are assigned.

The eight contacts of the storage module are defined vis-à-vis an electronic device, notably the mobile terminal, as follows: the contact C1 allows the mobile terminal (not illustrated) to supply (power) Vcc the electronic storage module: this may currently be 1.8 volts, 3 volts or 5 volts. The contact C5 allows provision of the ground GND for the supply of power by the mobile terminal.

Since the ISO and USB communication interfaces have the same function, they are used alternately. The invention then proposes also alternating the implementation thereof by the electronic storage module by proposing that a set of contacts constituted by the contacts C3 and C7 constitutes both:
- a first, ISO communication interface: the contact C3 providing the clock ISO1 of the ISO communication interface and the contact C7 allowing the inputs/outputs of data ISO2 according to the ISO standard between the electronic storage module and the mobile terminal, and
- a second, USB (Universal Serial Bus) communication interface: the contacts C3 and C7, which are also called D+ and D−, respectively, allowing the transmission of the data between the electronic storage module and the mobile terminal on a differential pair (USB1, USB2).

The contact C2 allows reinitialization (reset) RST of the electronic storage module, and indication of which of the first and second communication interfaces, ISO or USB, respectively, is implemented by the set of contacts that are formed by C3 and C7. The contact C6 constitutes a third, SWP (Single Wire Protocol) communication interface: this is a communication interface that is used for contactless protocols.

Thus, two contacts remain free on the electronic storage module with eight-contacts for any additional communication interface(s) requiring one or two contacts.

Figure 2B:
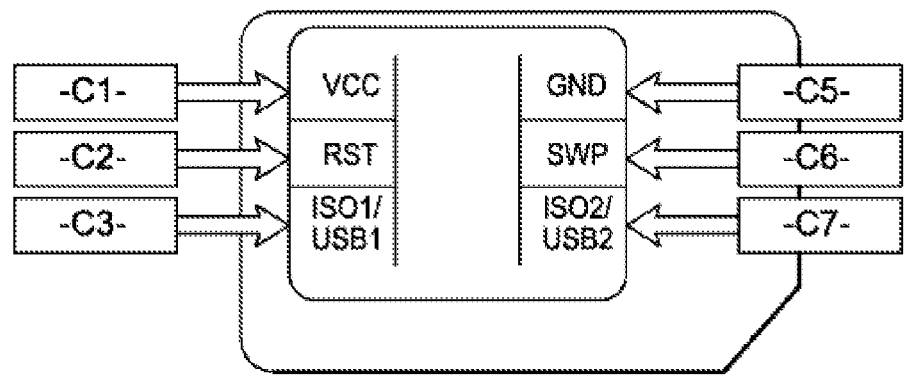

FIG. 2b illustrates an electronic storage module with six contacts according to the invention, to which contacts three communication interfaces according to the ISO, USB and SWP standards are assigned.

The six contacts of the storage module are defined vis-à-vis an electronic device, notably the mobile terminal, as follows: the contact C1 allows the mobile terminal (not illustrated) to supply (power) Vcc the electronic storage module: this may currently be 1.8 volts, 3 volts or 5 volts. The contact C5 allows provision of the ground GND for the supply of power by the mobile terminal. The set of contacts that is constituted by the contacts C3 and C7 constitutes both:
- a first, ISO communication interface: the contact C3 providing the clock ISO1 of the ISO communication interface and the contact C7 allowing the inputs/outputs of data ISO2 according to the ISO standard between the electronic storage module and the mobile terminal, and
- a second, USB (Universal Serial Bus) communication interface: the contacts C3 and C7, which are also called D+ and D−, respectively, allowing the transmission of the data between the electronic storage module and the mobile terminal on a differential pair (USB1, USB2).

The contact C2 allows reinitialization (reset) RST of the electronic storage module, and indication of which of the first and second communication interfaces, ISO or USB, respectively, is implemented by the set of contacts that are formed by C3 and C7. The contact C6 constitutes a third, SWP (Single Wire Protocol) communication interface: this is a communication interface that is used for contactless protocols.

Thus, the electronic storage module with six contacts supports the three communication interfaces that are used today by mobile terminals: ISO, USB and SWP.

FIG. 3 illustrates an electronic storage module according to the invention with at least six contacts to which at least three communication interfaces are assigned.

Contacts of the storage module are defined vis-à-vis an electronic device, notably the mobile terminal, as follows: the contact C1 allows the mobile terminal (not illustrated) to supply (power) Vcc the electronic storage module: this may currently be 1.8 volts, 3 volts or 5 volts. The contact C5 allows provision of the ground GND for the supply of power by the mobile terminal.

The invention then proposes alternating a plurality of communication interfaces I1, . . . , In that are used alternately in the implementation thereof by the electronic storage module by proposing that at least a first set of contacts EN1 that is constituted by the contacts C3 and C7 constitutes both:
- a first communication interface I1: the contact C3 providing the first contact I1_1 of this first interface I1 and the contact C7 providing the second contact I1_2 of this first interface I1, . . .
- an n-th communication interface In: the contact C3 providing the first contact In_1 of this n-th communication interface In and the contact C7 providing the second contact In_2 of this n-th communication interface In.

The contact C2 allows reinitialization (reset) RST of the electronic storage module, and indication of which of the first . . . n-th communication interfaces is implemented by this first set of contacts that are formed by C3 and C7.

In the particular case of n=2, that is to say a first interface and a second interface that are assigned to this first set of contacts EN1, the contact C2 in a state 0 will control the implementation of the first interface I1 on this set of contacts EN1, and in a state 1 will control the implementation of the second interface I2 on this set of contacts EN1.

In the particular case of n=3, that is to say a first interface I1, a second interface I2, a third interface I3 to of first set of contacts EN1, the contact C2 in a state 00 (0 volt) will control the implementation of the first interface I1 on this set of contacts EN1, in a state 01 (1.8 volts, for example) will control the implementation of the second interface I2 on this set of contacts EN1, and in a state 11 (3 volts, for example) will control the implementation of the third interface I3 on this set of contacts EN1. Another solution is to set up an interchange protocol on the contact C2, a protocol allowing setup of the interface I1, I2 or I3 activated as a function of the binary variations sent on the contact C2. One possible implementation when 3 interfaces can be selected would be to set up the interface selection code as follows:

| First state of the contact C2 | Second state of the contact C2 | Interface selected on C3 and C7 |
|---|---|---|
| 0 | 0 | I1__1 and I1__2 |
| 0 | 1 | I2__1 and I2__2 |
| 1 | 0 | I3__1 and I3__2 |

This protocol can be generalized to more than 2 selectable interface powers n, n being the state number to be sent to the interface C2 in order to select the correct interface on the contacts C3 and C7.

The contact C6 constitutes at least one n+1th SWP (Single Wire Protocol) communication interface: this is a communication interface that is used for contactless protocols.

FIG. 4 illustrates an assignment method according to the invention.

The assignment method involves the assignment to a set of contacts of an electronic storage module ATT_ENj of at least one first communication interface I1 (i=1) and a second communication interface I2 (i=2) between the electronic storage module and an electronic device as a function of a state of a reinitialization contact C2 of said electronic storage module.

Notably, the assignment method involves the assignment ATT_ENj to a set j of contacts of a first interface I1, composed of two contacts I1__1, I1__2, by associating therewith a state Ei for the reinitialization contact C2. The assignment method verifies OI(ENj)? whether an additional interface needs to be assigned to this set of contacts ENj; if so, the assignment method involves the assignment ATT_ENj to a set j of contacts of a second interface I2, composed of two contacts I2__1, I2__2, by associating therewith a state Ei for the reinitialization contact C2. The assignment method verifies OI(ENj)? whether an additional interface needs to be assigned to this set of contacts ENj; if so, the assignment method is continued on the set of contacts ENj, and if not, the assignment method is possibly continued on another set of contacts ENj+1 having one or more contacts.

FIG. 5 illustrates a method for implementing an assignment according to the invention.

The electronic storage module receives, on its reinitialization contact C2, a piece of information corresponding to the toggling of the contact C2 to a state Ei. The electronic storage module is then reinitialized owing to the change of state of the contact C2, and then the contacts of at least one set of contacts ENj (as illustrated by FIG. 5) that is controlled by the new state Ei of the contact C2 implement the interface Ii that is associated with this state Ei.

Thus, the mobile terminal will be able to interchange with the electronic storage module via the interface Ii that is implemented by the contacts of the set of contacts ENj.

An electronic device (not illustrated) has at least means for connecting at least one electronic storage module. The connection means have a plurality of connectors allowing each to connect a contact of an electronic storage module, including at least one reinitialization connector, and at least one first set of connectors constituting a first communication interface between the electronic storage module and the electronic device. The first set of connectors constitutes at least one second communication interface between the electronic storage module and the electronic device, the connection means allowing indication on the reinitialization connector of which of the first and second communication interfaces said first set of contacts implements at a given instant.

The invention thus allows a reduction in the size of the chip cards that are currently used to be envisaged while retaining compatibility with all of the defined interfaces: ISO, USB and SWP. This size reduction notably allows terminals that are smaller or that support bulkier components to be envisaged.

Moreover, the invention allows a cost reduction for SIM cards—by requiring two contacts fewer and by allowing a reduction in the plastic used—and in the terminals—owing to the reduction in connectors, requiring two contacts fewer on the connector for the SIM card.

The invention is also aimed at a storage medium. The information storage medium may be any entity or device that is capable of storing at least one of the programs. By way of example, the storage medium may have a storage means, such as a ROM, for example a CD-ROM or a microelectronic circuit ROM, or else a magnetic recording means, for example a floppy disk or a hard disk.

Moreover, the information storage medium may be a transmissible medium such as an electrical or optical signal, which can be routed via an electrical or optical cable, by radio or by other means. The program for implementing an assignment according to the invention may be particularly downloaded on a network, notably of Internet type.

Alternatively, the information storage medium may be an integrated circuit that incorporates the program, said circuit being suited to executing or to being used in the execution of the method in question.

In another implementation, the invention is implemented by means of software and/or hardware components. From this perspective, the term module may correspond either to a software component or to a hardware component. A software component corresponds to one or more computer programs, one or more subroutines of a program, or more generally to any element of a program or a piece of software that is capable of implementing a function or a set of functions according to the description below. A hardware component corresponds to any element of a hardware set that is capable of implementing a function or a set of functions.

Although the present disclosure has been described with reference to one or more examples, workers skilled in the art will recognize that changes may be made in form and detail without departing from the scope of the disclosure and/or the appended claims.

The invention claimed is:

1. An electronic storage module comprising:
a plurality of contacts, including at least one reinitialization contact and at least one first set of contacts comprising a first contact and a second contact;
the electronic storage module being configured to implement a plurality of different communication interfaces between the electronic storage module and an electronic device having said electronic storage module, over the same first and second contacts, wherein a predetermined one of the plurality of different communication interfaces is implemented on the first and second contacts at a given instant selectively as a function of an electrical state of the at least one reinitialization contact, wherein the plurality of different communication interfaces are associated with respective electrical states having different steady-state voltage levels.

2. The electronic storage module as claimed in claim 1, wherein said reinitialization contact triggers reinitialization of content of the electronic storage module upon a change of the electrical state of said reinitialization contact.

3. The electronic storage module as claimed in claim 1, wherein said electronic storage module has at least one second set of contacts constituting a further communication interface.

4. The electronic storage module as claimed in claim 1, wherein said electronic storage module has only six contacts, including:
said first and second contacts selectively constituting a first communication interface according to the ISO standard and a second communication interface according to the USB standard,
said reinitialization contact indicating:
in a first state that said first and second contacts implement the first communication interface according to the ISO standard,
in a second state that said first and second contacts implement the second communication interface according to the USB standard, and
upon a change between the first and second states, a reset to a default state of the electronic storage module.

5. An electronic storage module comprising:
only six contacts, including at least one reinitialization contact and at least one first set of contacts comprising a first contact and a second contact, said first and second contacts selectively constituting a first communication interface according to the ISO standard and a second communication interface according to the USB standard;
the electronic storage module being configured to implement the first and second communication interfaces between the electronic storage module and an electronic device having said electronic storage module, over the same first and second contacts, wherein a predetermined one of the first and second communication interfaces is implemented on the first and second contacts at a given instant selectively as a function of an electrical state of the at least one reinitialization contact, wherein said reinitialization contact indicates:
in a first state that said first and second contacts implement the first communication interface according to the ISO standard,
in a second state that said first and second contacts implement the second communication interface according to the USB standard, and
upon a change between the first and second states, a reset to a default state of the electronic storage module.

6. A method comprising:
assigning contacts of an electronic storage module having a plurality of contacts, including at least one reinitialization contact and at least one first set of contacts comprising a first contact and a second contact, the electronic storage module being configurable to implement a plurality of different communication interfaces over the same first and second contacts, wherein assigning contacts comprises:
applying an electrical state to said at least one reinitialization contact; and
assigning by the electronic storage module to said first and second contacts a predetermined one of the plurality of different communication interfaces between the electronic storage module and an electronic device as a function of said state on said reinitialization contact, wherein said electrical state corresponds to one of a plurality of respective electrical states, each of the electrical states corresponding to a respective one of the plurality of different communication interfaces and having a different steady-state voltage level than the other electrical states of the plurality.

7. A non-transmissible storage medium comprising a program stored thereon and comprising program code instructions for execution of a method of assigning contacts when said program is executed by a processor, wherein the method comprises the following acts performed by the processor as configured by the instructions:
applying an electrical state to at least one reinitialization contact of an electronic storage module having a plurality of contacts, including the at least one reinitialization contact and at least one first set of contacts comprising a first contact and a second contact, the electronic storage module being configurable to implement a plurality of different communication interfaces over the same first and second contacts; and
assigning to said first and second contacts a predetermined one of the plurality of different communication interfaces between the electronic storage module and an electronic device as a function of the electrical state applied to said reinitialization contact, wherein said electrical state corresponds to one of a plurality of respective electrical states, each of the electrical states corresponding to a respective one of the plurality of different communication interfaces and having a different steady-state voltage level than the other electrical states of the plurality.

8. A method comprising:
receiving an electrical state on at least one reinitialization contact of an electronic storage module having a plurality of contacts, including the at least one reinitialization contact and at least one first set of contacts comprising a first contact and a second contact, the electronic storage module being configurable to implement a plurality of different communication interfaces over the same first and second contacts; and
implementing an assignment of the first and second contacts, as a function of the electrical state received on said reinitialization contact, a predetermined one of the plurality of different communication interfaces between the electronic storage module and an electronic device, wherein said electrical state corresponds to one of a plurality of respective electrical states, each of the electrical states corresponding to a respective one of the plurality of different communication interfaces and having a different steady-state voltage level than the other electrical states of the plurality.

9. A non-transmissible storage medium comprising a program stored thereon and comprising program code instructions for execution of an assignment implementation when said program is executed by a processor, wherein the method comprises the following acts performed by the processor as configured by the instructions:
receiving an electrical state on at least one reinitialization contact of an electronic storage module having a plurality of contacts, including the at least one reinitialization contact and at least one first set of contacts comprising a first contact and a second contact, the electronic storage module being configurable to implement a plurality of different communication interfaces over the same first and second contacts; and
implementing an assignment of the first and second contacts, as a function of the electrical state received on said reinitialization contact, a predetermined one of the plurality of different communication interfaces between the electronic storage module and an electronic device, wherein said electrical state corresponds to one of a plurality of respective electrical states, each of the electrical states corresponding to a respective one of the plurality of different communication interfaces and having a different steady-state voltage level than the other electrical states of the plurality.

10. An electronic device comprising:
a plurality of connectors allowing each to connect to a respective contact of an electronic storage module, including at least one reinitialization connector, and at least one first set of connectors comprising a first contact and a second contact, the electronic storage module being configurable to implement a plurality of different communication interfaces between the electronic storage module and the electronic device, over the same first and second contacts; and
means for connecting the electronic storage module, which applies a respective electrical state on the reinitialization contact for selectively implementing a predetermined one of the plurality of different communication interfaces on the first and second contacts at a given instant as a function of the electrical state, wherein the plurality of different communication interfaces are associated with respective electrical states having different steady-state voltage levels.

11. The electronic storage module of claim 1, wherein the at least one reinitialization contact comprises a single reinitialization contact, the selection between each of the plurality of different communication interfaces is made through the single reinitialization contact, and the electrical state is selected from the group consisting of:
a single binary logic state received on the reinitialization input;
a relative voltage level among at least three predetermined voltage levels.

12. The electronic storage module as claimed in claim 5, wherein one of said six contacts constitutes a third communication interface according to the SWP standard.

* * * * *